United States Patent [19]

Fischer

[11] 4,414,297

[45] Nov. 8, 1983

[54] SHUNT ELEMENT

[75] Inventor: Wilfried Fischer, Neckargemünd, Fed. Rep. of Germany

[73] Assignee: Brown, Boveri & Cie AG, Mannheim, Fed. Rep. of Germany

[21] Appl. No.: 371,121

[22] Filed: Apr. 23, 1982

[30] Foreign Application Priority Data

May 2, 1981 [DE] Fed. Rep. of Germany ....... 3117385

[51] Int. Cl.³ .......................................... H01M 10/42
[52] U.S. Cl. ...................................... 429/61; 429/104
[58] Field of Search ...................... 429/49, 61, 104, 7; 338/49

[56] References Cited

U.S. PATENT DOCUMENTS

| | | | |
|---|---|---|---|
| 2,624,033 | 12/1952 | Jacquier | 429/7 |
| 4,124,739 | 11/1978 | Sudworth | 429/61 |
| 4,252,869 | 2/1981 | Heitz et al. | 429/104 |

FOREIGN PATENT DOCUMENTS 2062939 5/1981 United Kingdom ................ 429/104

*Primary Examiner*—Donald L. Walton
*Attorney, Agent, or Firm*—Herbert L. Lerner; Laurence A. Greenberg

[57] ABSTRACT

Shunt element for an electrochemical storage cell or a group of several parallel-connected storage cells of the alkali metal and chalcogen type, with at least one anode space for the anolyte and a cathode space for the catholyte, which spaces are separated from each other by an alkali ion-conducting solid electrolyte wall and, at least in places, are bounded by a metallic housing. The shunt element has at least two directly adjoining spaces which can be connected to each other. The first such space is filled with a metal or with a decomposable metal compound. The second such space contains the contact surfaces of at least two electrodes which are arranged at a defined distance from each other. The first electrode is additionally connected to at least one electron-conducting surface of the first space. The two electrodes can be connected to the storage cell or cells.

19 Claims, 4 Drawing Figures

SHUNT ELEMENT

BACKGROUND OF THE INVENTION

1. Field of the Invention

The invention relates to a shunt element for an electrochemical storage cell or a group of several storage cells connected in parallel, of the alkali metal and chalcogen type, with at least one anode space for receiving the anolyte and a cathode space for receiving the catholyte, which are separated from each other by an alkali ion-conducting solid electrolyte wall and, at least in some areas, are bounded by a metallic housing.

2. Description of the Prior Art

Such shunt elements are used primarily in high-temperature batteries composed of electrochemical storage cells of the alkali metal and chalcogen type. The shunt elements electrically shunt destroyed storage cells which can be separated in this manner from the circuit of the high-temperature battery. The operability of the high temperature battery is thereby substantially maintained.

High-temperature batteries which are constructed from electrochemical storage cells, will be used in the future to an increasing extent for the electric propulsion of vehicles.

In such vehicle batteries, it is required that many electrochemical storage cells be connected in series and only a few storage cells in parallel. Reasons for this are that the energy content of such a battery is in general smaller than 40 kWh and the energy content of a single storage cell will be larger than 80 Wh. It follows that a vehicle battery will not contain more than 500 storage cells. If a total of 200 volts is to be generated with such a battery at a voltage of the individual storage cell of about 2 volts, 100 storage cells must be connected in series. This means that at most 5 storage cells can be connected in parallel. Since, with 5 parallel-connected storage cells the redundancy is not yet very great, it is advantageous to connect as many storage cells as possible in series. Such branches can then be connected in parallel so that the circuit diagram shown in FIG. 1 is obtained. In this drawing, the storage cells are shown only by their electrical terminals. As may be seen from this drawing, n storage cells are connected together in series-fashion to form a branch. m branches with n storage cells each are connected parallel and form a block. The entire battery consists of p such series-connected blocks. According to the example shown in FIG. 1, it contains $n \times m \times p$ storage cells.

Problems arise in the described circuit if a storage cell becomes defective. In the case of sodium-sulfur storage cells it has been found that a defect usually occurs by the fact that in time the solid electrolyte develops cracks so that the reaction materials sodium and sulfur can react with each other directly and no voltage is delivered by the storage cell. Such a defective storage cell then has infinitely large resistance which usually is more that a factor 2 greater than the ohmic resistance of an intact storage cell. As the result, less charging and discharging current flows through the branch containing a defective storage cell. If the resistance of the defective storage cell is very high, then practically only $m-1$ branches of the battery still contribute to the capacity of the battery. This means that the capacity of the entire battery is smaller under these conditions by a factor $(m-1)/m$ than that of an intact battery.

SUMMARY OF THE INVENTION

An object of the invention is to provide a shunt element for an electrochemical storage cell or a group of parallel-connected storage cells, which shunt element has a very high internal ohmic resistance when the storage cell or group of cells is intact, but which internal ohmic resistance, however, becomes very small if a defect occurs in a storage cell, and permits jumping the circuit through said storage cell or through the group of parallel-connected storage cells for any period of time desired.

With the foregoing and other objects in view, there is provided in accordance with the invention, a shunt element for an electrochemical storage cell based on alkali metal and chalcogen, with at least one anode space for the anolyte and a cathode space for the catholyte, which spaces are separated from each other by an alkali ion-conducting solid electrolyte wall, and at least in places, are bounded by a metallic housing, comprising a first chamber with its interior space containing a metal or a decomposable metal compound, a second chamber with its interior space having two spaced contact surfaces, said two interior spaces adjoining one another, connecting means through which said metal in the first interior space moves into said adjoining second interior space, a first electrode connected to one spaced contact surface and a second electrode connected to the other contact surface, said first electrode additionally connected to at least one electron-conducting surface of the first space, and said two electrodes adapted for connection to the electrochemical storage cell.

Other features which are considered as characteristic for the invention are set forth in the appended claims.

Although the invention is illustrated and described herein as embodied in a shunt element, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings in which.

DETAILED DESCRIPTION OF THE INVENTION

Figure 1:
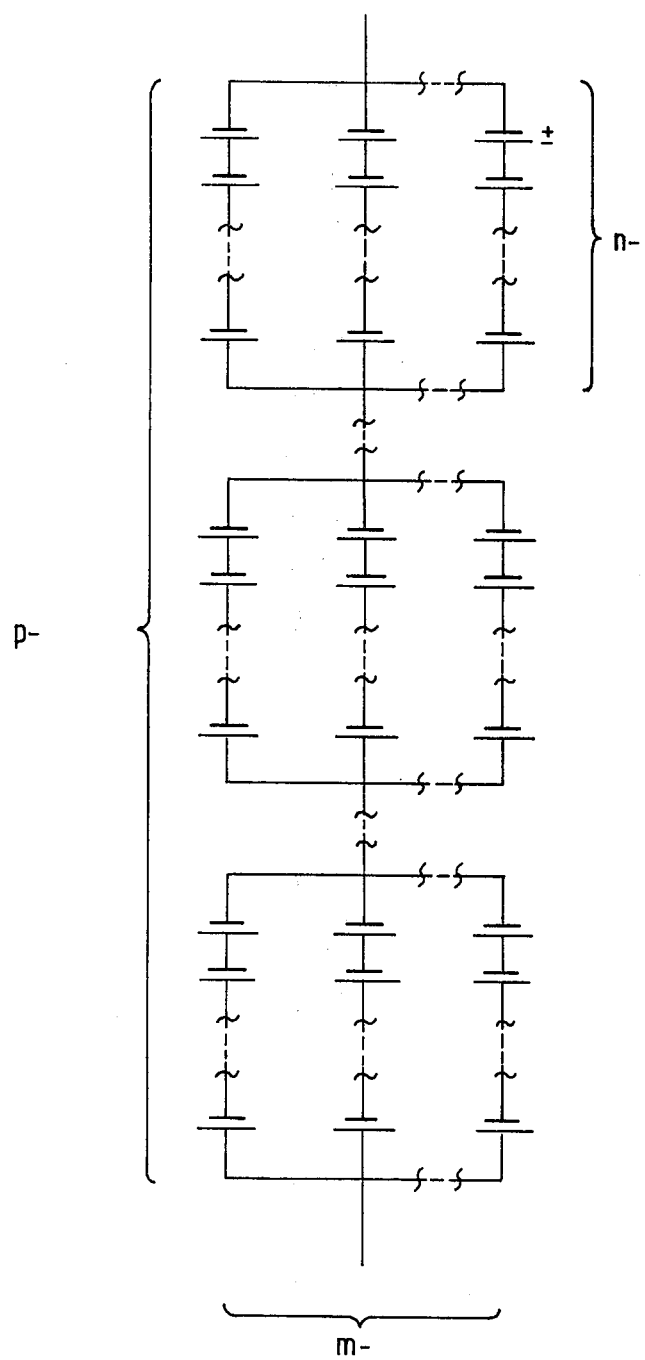
FIG. 1 shows a schematic arrangement of cells in a high-temperature battery in which individual cells are connected in series and several such series groups are connected in parallel to form a parallel group, and several parallel groups are connected in series.

In accordance with the invention at least two directly adjoining spaces are provided which can be connected together. The first space is filled with a metal or a decomposable metal compound, and the second one contains, arranged at a defined distance, contact surfaces with at least two electrodes. At least the first electrode is connected additionally to at least one electron-conducting surface of the first space, and both electrodes can be connected to the storage cell.

According to the invention, the first electrode of the shunt element is connected to the anodic current collector of the storage cell and the second electrode to the cathodic current collector. In one embodiment of the invention, the two spaces are separated from each other by an ion-conducting and preferably an alkali ion-conducting wall. In another embodiment of the invention, the two spaces are in communication with each other in certain areas or are separated from each other by a thin diaphragm. The latter can be ruptured by means of gas overpressure. The two spaces of the shunt element can be confined by two cylinders of different diameters, both of sodium-beta/beta"-aluminum oxide.

The cylinder with the smaller diameter is arranged concentrically within the second cylinder. The metal or the decomposable metal compound is filled into the annular space between the two cylinders. Preferably, a metal is chosen for this purpose which is liquid at 350° C. The preferred metal compound is decomposed at this temperature. The preferred metal, sodium which meets the above-mentioned conditions, is filled into the annular space. The two cylinders have the same length and are closed off at both ends by respective aluminum oxide discs. Within the annular space into which the sodium is filled, a metal screen is stretched out at a defined distance from the inner boundary surfaces of the outer cylinder all the way around; this screen completely covers the inside boundary surfaces of this cylinder. A metal felt and/or metal wool is arranged between this metal screen and the inside boundary surface of the outer cylinder. This metal screen is in communication with the first electrode of the shunting element in an electrically conducting manner via a feedthrough in the first aluminum oxide disc closing both cylinders. The first electrode of the shunt element is connected to a contact surface via a second feedthrough in the first aluminum disc. This contact surface is arranged in the second space of the shunt element which is located in the interior of the cylinder with the smaller diameter. The second electrode of the shunt element is likewise connected to a contact surface via a feedthrough in the aluminum oxide disc closing off the second of the two cylinders. This contact surface is arranged within the second space. It is surrounded by a metal felt which is arranged, in some areas, within the second space and is in electrically conducting contact with the ion-conducting boundary surfaces of the second space. The contact surfaces of the two electrodes are arranged here opposite each other. Their distance is slightly smaller than the height of the second space, about that of the two cylinders.

In a second embodiment of the invention, the two spaces of the shunt element are formed by two aluminum cylinders. These are arranged so that their longitudinal axes lie on a straight line. They are sealed from each other by a beta/beta"-aluminum oxide disc. The first space is again filled with a metal or a metal compound which has the above-described properties. Preferably, the cylinder forming the first space is filled with sodium. The second end of this cylinder is closed off by squeezing together its walls and by subsequent welding. The second end of the second cylinder is connected to an aluminum oxide disc which has a central feedthrough. The hermetic sealing of this cylinder end is accomplished by an aluminum disc. Inside this cylinder, which forms the second space, a metal felt is arranged in some places. This metal felt is in close conducting contact with the beta/beta" aluminum oxide disc and the inner boundary surfaces of this aluminum cylinder. The aluminum disc closing off the second space is connected in an electrically conducting manner to a contact surface. This contact surface is pushed through the feedthrough of the aluminum oxide disc and extends into the second space. The first electrode of this shunt element is connected in a conducting manner to the outside surfaces of the first aluminum cylinder which forms the first space, and to the aluminum disc at the second end of the second cylinder. The second electrode of the shunt element is connected in an electrically conducting manner to the metallic boundary surface, especially to the outside surface of the aluminum cylinder forming the second space.

In a third embodiment of the invention, the first space is bounded by a cylinder of the beta/beta/"-aluminum oxide or a cylinder of aluminum oxide, which has a flange at one end which points inward. To this end is directly adjoined a tube of aluminum oxide closed at one end. The tube is connected to the cylinder in such manner that its opening faces the cylinder. The interior of the cylinder is filled with a metal felt. The latter is saturated with the liquid metal, preferably with sodium.

The inward-pointing flange of the cylinder closes off its interior only in some regions so that an opening remains between the first space filled with the liquid metal and the adjoining second space. The two spaces can be sealed against each other by a thin diapharagm. This diaphragm is designed so that it is destroyed upon a slight increase of the gas pressure within this space. The second space bounded by the tube of aluminum oxide has at its closed end, two feedthroughs arranged at a defined distance. Through each feedthrough, a contact surface for an electrode is pushed with protrudes into the interior of the second space. The first electrode of the shunt element is connected to one of these contact surfaces in a conducting manner. The second contact surface is connected to the second electrode in an electrically conducting manner. The first space, which is filled with the liquid metal, is closed off at its second end by a very thin aluminum disc. This is followed by a tube which consists substantially of zirconium oxide, conducts oxygen ions and is closed on one side. The opening of this tube faces the aluminum disc which closes off the first space. This tube represents an extension of the first space. At its closed end, this tube has a feedthrough. Through the feedthrough, the contact surface for an electrode is pushed. This contact surface runs parallel to the longitudinal axis of the tube and extends up to the aluminum disc separating the first space and the aluminum disc. The inside and outside surfaces of the zirconium oxide tube are coated with an electron-conducting layer. This is in particular a layer of firing-on platinum or silver. The first electrode of the shunt element is additionally connected to the outside surface of the zirconium oxide tube. The second electrode of the shunt element is in communication in a conducting manner with the contact surface arranged inside the zirconium oxide tube.

The shunt element according to the invention is connected parallel to a storage cell or several parallel-connected storage cells. Normally, the shunt element has a very high ohmic resistance, so that only a very small, negligible current flows through it. The ohmic resistance of the shunt element becomes very small, however, if the voltage normally applied to the two electrodes of the shunt element is reversed. This case occurs if the storage cell connected parallel to the shunt element, or a storage cell of the group of parallel-connected storage cells is connected to those of a shunt element, becomes defective and no longer delivers voltage. Such defective storage cells can present a high resistance within the circuit of a battery. By the shunt element according to the invention, such a storage cell which has become defective or the entire group of parallel-connected storage cells is short-circuited. Current limitation within the branch in which the defective storage cell is located is thereby precluded. The shunt element according to the invention has a surprisingly simple design, which, in addition, can be kept very small. The shunt elements connected in parallel in the storage cells therefore require only very little volume within the battery space. It is sufficient if the second space of the shunt element, in which the two electrodes are located, which are short-circuited if the shunt element is activated by the liquid metal, have a cross section of 1 to 5 mm². It is ensured by this size of the second space that the current normally flowing through the storage cell and which can amount to several amperes, can be accepted without problem by the shunt element.

The invention will be explained in greater detail in the following, making reference to the drawings.

Figure 2:
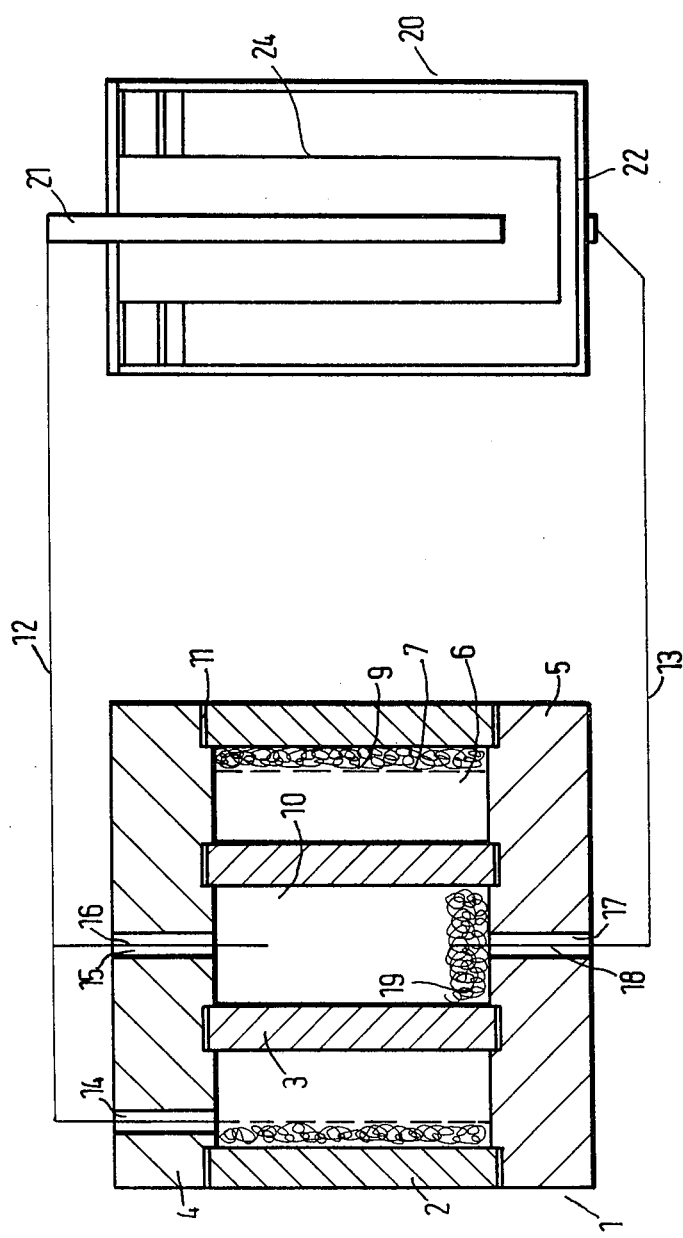
FIG. 2 diagrammatically illustrates a vertical section of a shunt element according to the invention shunted across an electrochemical storage cell. The shunt element has an outer cylinder and an inner cylinder both made of beta/beta" aluminum oxide. The annular space between the cylinders is filled with sodium which when a defect occurs in the cell passes through the inner cylinder wall into the interior called the second space. Special contact surfaces of a first and a second electrode protrude into the second space and when the sufficient sodium enters the second space, make electrical contact between the spaced contact surfaces. The cell to which the electrodes are connected, is shunted.

The shunt element 1 shown in FIG. 2 is formed substantially of two cylinders 2 and 3 which consist of beta/beta''-aluminum oxide, and two discs of aluminum oxide 4 and 5. The two cylinders 2 and 3 have different diameters. Cylinder 3 with a smaller diameter is arranged concentrically within cylinder 2. The diameters of the two cylinders are chosen so that an annular space 6 remains between them, the volume of which corresponds approximately to the inside volume of cylinder 3. At a predeterminable distance from the inner boundary surfaces of cylinder 2, a metal screen 7 is stretched all around within the space 6 which covers the inside surfaces of the cylinder 2.

Between this metal screen 7 and the inside boundary surface of cylinder 2, a metal felt 9 is arranged. Instead of the metal felt 9, metal wool can also be used. The interior of cylinder 3 represents the second space 10 of the shunt element 1. The two cylinders 2 and 3 have the same height and are sealed hermetically from each other and from the outside at their ends by common aluminum oxide discs 4, 5 respectively. The joint between cylinders 2 and 3 and the two aluminum oxide discs 4 and 5 is made via a special glass 11. The shunt element 1 is provided with two electrodes 12 and 13 for an electrically conducting connection to a storage cell 20. The aluminum oxide disc 4 is provided in the region of the space 6 with a feedthrough 14, via which the metal screen 7 is connected in an electrically conducting manner through the first electrode 12 of the shunt element 1. The aluminum oxide disc 4 is connected to a second feedthrough in the vicinity of the space 10. Through this feedthrough 15 is pushed a contact surface 16 which extends into the space 10. The second aluminum oxide disc 5 is likewise provided in the area of space 10 with a feedthrough 17 through which a second contact surface 18 is brought which likewise extends into the second space 10 of the shunt element 1. The contact surface 18 is surrounded by a metal felt 19 which has intimate contact with the inner boundary surfaces of the cylinder 3 and with the contact surface 18. The contact surface 18 is connected in an electrically conducting manner to the second electrode of the shunt element 1. All feedthroughs 14, 15 and 17 of the two aluminum oxide discs 4 and 5 are sealed hermetically again after the electrical connections or contact surfaces, respectively, are brought through. The two electrodes 12 and 13 of the shunt element 1 are connected in an electrically conducting manner to the two current collectors of a storage cell 20, so that the shunt element is connected parallel to the storage cell. In particular, the first electrode 12 is connected to the anodic current collector 21 and the electrode 13 is connected to the cathodic current collector 22. Before the shunt element 1 is used in a battery, space 6 is further filled with a metal, particularly a metal that is liquid at 350° C. In this example, sodium is used, as already mentioned above. The space 6 can be filled with the sodium by electrolyzing the sodium through the beta/beta''-aluminum oxide cylinder 2 into the space 6. In FIG. 2, the shunt element according to the invention is connected parallel to the schematically shown storage cell 20. The storage cell 20 comprises substantially a cup-shaped housing 22 of metal which carries corrosion protection on its inside surfaces. Inside the housing 22, a tube 24, closed at one end, of beta aluminum oxide is arranged. The dimensions of this solid electrolyte are chosen so that a space remains on all sides between the electrolyte and the interior boundary surfaces of the cup-shaped metal housing 22. This space serves as the cathode space and is filled with sulfur. The interior of the solid electrolyte 24 serves as the anode space and is filled with liquid sodium. The metallic housing 22 of the storage cell 20 serves as the cathodic current collector. To it is also connected the electrode 13 of the shunt element 1. The anodic current collector 21, preferably formed by a metal rod which is resistant to sodium, extends into the anode space and slightly protrudes beyond the closure of the storage cell 20 toward the outside.

In the conventional manner, it is connected in an electrically conducting manner to the first electrode 12 of the shunt element 1.

In the following, the operation of the shunt element according to the invention will be described. In normal operation of the sodium/sulfur storage cell 20, which is, for instance, arranged within a branch of n series-connected sodium/sulfur storage cells of a battery, the shunt element 1 connected parallel thereto is inactive. The voltage present at the shunt element attempts to transport sodium from the space 10 into space 6, where all the sodium is located. The ohmic resistance of the shunt element 1 is particularly infinite in this state. If, however, a break of the solid electrolyte comes about in the sodium/sulfur storage cell 20, it loses this property of an active storage cell, i.e. its rest voltage becomes zero. This means that in the defective storage cell, a voltage in the reverse direction occurs at the defective storage cell when this branch of the battery is discharged into. As already mentioned above, the shunt element 1 of this storage cell is connected in parallel. Thereby, a reversal of the direction of the voltage occurs also at its two electrodes 12 and 13. This voltage reversal at the shunt element 1 brings about the transport of the sodium from space 6 into the second space 10 of the shunt element. If this space 10 is completely filled with sodium, the two contact surfaces 16 and 18 of the two electrodes 12 and 13 are connected together in an electrically conducting manner via the sodium. Thereby, the defective storage cell is separated from the circuit of the branch into which it is connected. With the shunt element described herein, it is possible that the contact between the sodium and the contact surface 16 of the first electrode 12 gets temporarily lost through vibration. This is immaterial in as much as then the sodium transport sets in again in the manner described until contact is reestablished. If the contact surface is connected in the restoration to a non-conductive coating, which is dissolved after some time in liquid sodium, it thereby releases the contact, and this difficulty is removed. Through this measure, the sodium transport is continued into space 10 until a sodium level adjusts itself which stands above the lower edge of the contact surface, until the protective layer on the contact surface has been dissolved away.

Figure 3:
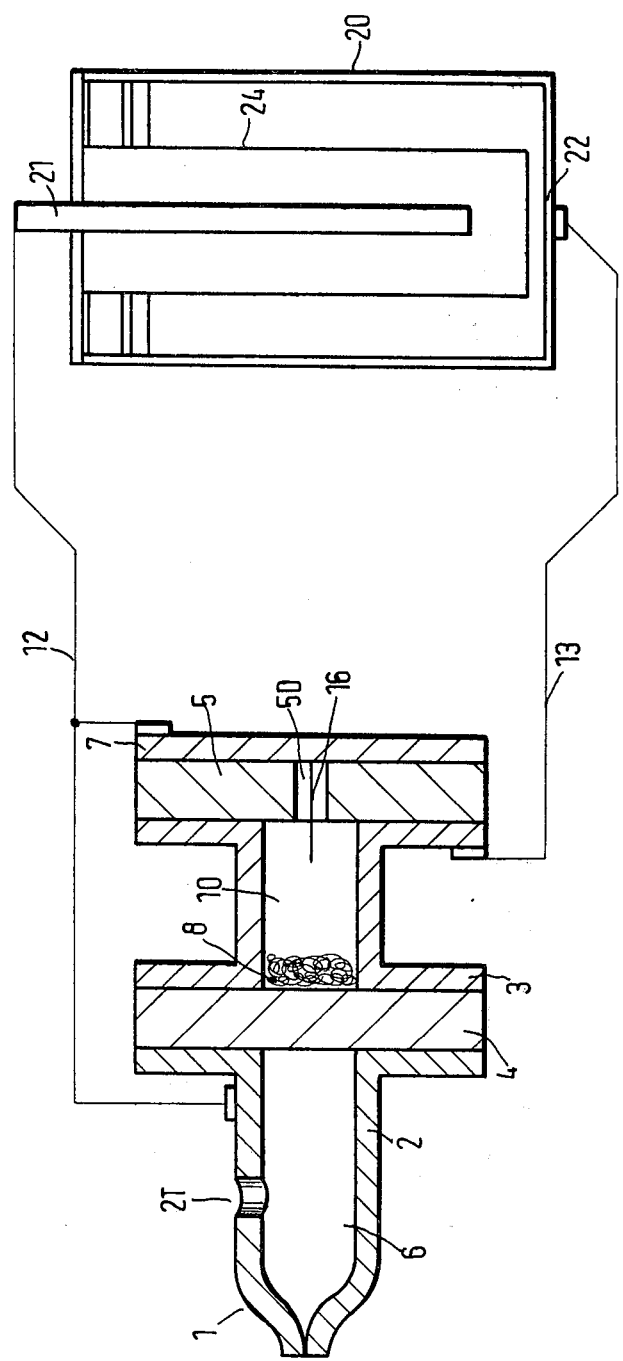
FIG. 3 is a variant of FIG. 2 showing a shunt element in which two cylinders lie horizontally adjacent with a beta/beta" aluminum oxide separating the two interiors of the cylinders.

FIG. 3 likewise shows a shunt element 1 for a sodium/sulfur storage cell. This shunt element 1 has two spaces 6 and 10 which are separated from each other by an alkali ion-conducting wall. The two spaces 6 and 10 are each defined by two cylinders 2 and 3 which are made of aluminum. The aluminum cylinder forming the first space 6 has an outward-pointing flange at its first end. Set against this flange is a washer of beta/beta"-aluminum oxide 4 which closes off the interior of space 6 at this end. At the second end of this cylinder 2 the walls are squeezed and welded together to form a hermetic seal. Cylinder 2 is also filled with sodium here. The second end is preferably closed off after the sodium is filled in. Instead of the sodium, another metal can also be used which meets the above-described requirements. The aluminum cylinder 3 which forms the second space 10 of the shunt element 1 is provided at both its ends with an outward-directed flange. Directly following the aluminum cylinder 3 at its open end is the beta/beta"-aluminum disc 4, which forms the closure of its interior at this end. The diameters of the two cylinders 6 and 10 are approximately the same size. Their longitudinal axes are arranged on a straight line. Onto the flange of the second end of the aluminum cylinder 3 is placed an aluminum oxide disc 5 which has a central hole 5D. The aluminum cylinder 3 is closed off by an aluminum disc 7 which is seated on the aluminum oxide disc 5. The two aluminum cylinders 2 and 3 are connected in a force-locking manner to the discs which are deliniated or closed off from each other thereby hermetically closing off the two spaces 6 and 10 to the outside. The beta/beta"-aluminum oxide disc 4 is the means for a passage for alkali metal ions between the two spaces 6 and 10. In the embodiment of the shunt element 1 described here, the aluminum cylinders 2 and 3 are connected to the ceramic parts via the known thermo-compression method.

A metal felt 8 is arranged in some places in the interior of the second space 10. Felt 8 is in intimate contact with the ion-conducting disc 4 and the inside boundary surfaces of the aluminum cylinder 3. The first electrode 12 of the shunt element 1 is connected in an electrically conducting manner to the outside surface of the aluminum cylinder 2 of the space 6 and to the aluminum disc 7. A contact surface 16 is fastened to the aluminum disc 7. The latter is pushed through the feedthrough 5D in the aluminum oxide disc 5 and protrudes into the space 10. The second electrode 13 of the shunt element 1 is connected in an electrically conducting manner to the outside surface of the aluminum cylinder 3. As in the embodiment example of the shunt element described in FIG. 2, the first electrode 12 is connected here to the anodic current collector 21 of the sodium/sulfur storage cell 20, while the second electrode 13 is connected to the cathodic current collector 22 of the sodium/sulfur storage cell. The operation of this shunt element 1 corresponds in substance to the operation of the shunt element 1 which is shown in FIG. 2 and explained in the corresponding description. If the storage cell 20 has no defects, the internal ohmic resistance of the shunt element 1 connected parallel to it is infinite. If a reversal of the voltage at the storage cell 20 comes about and therefore also a reversal of the voltage at the electrodes 12 and 13 of the shunt element 1, transport of the sodium contained in space 6 to the second space 10 is brought about. The transport is interrupted when sufficient sodium enters the space 10 such that the inner boundary surface of the aluminum cylinder 3 is connected to the contact surface 16 via the sodium. Due to the reduction of the internal resistance in the shunt element 1, the circuit is bridged by the storage cell and the storage cell is short-circuited. As already mentioned, instead of a liquid metal, a metal compound which decomposes to produce a metal may be filled into the space 6. Of interest in this connection is, for instance, a mixture of $NaNO_3$ and $NaNO_2$. In the event of a voltage reversal at the electrodes of the shunt element, the mixture is decomposed after the storage cell has become defective. Sodium and NO as well as $NO_2$ are formed. The sodium or the sodium ions, respectively, migrate through the beta/beta"-aluminum oxide disc 4 into the space 10. The nitrogen oxide accumulates in the space 6 until the pressure built up by it leads to rupture of the diaphragm 2T in the cylinder 2. The diaphragm 2T is produced by designing the cylinder wall thinner at that point.

Figure 4:
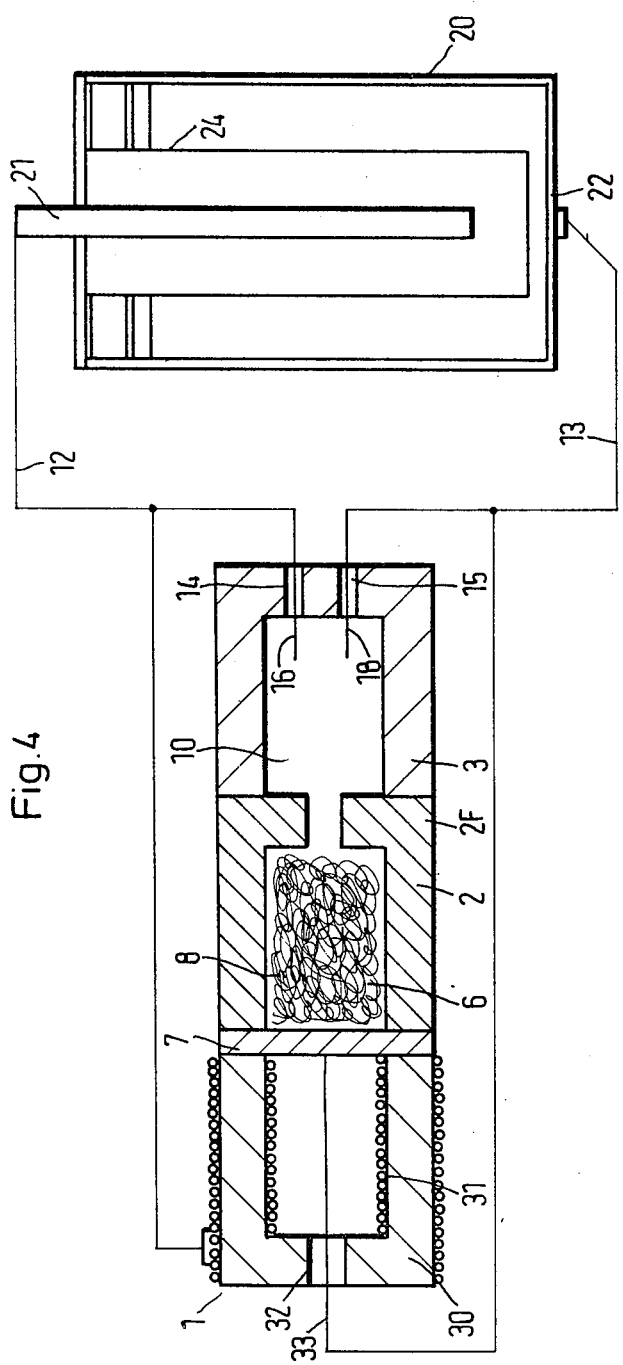
FIG. 4 shows a shunt element with a cylinder with its space filled with sodium and an adjacent cylinder with a second space into which protrude two spaced contact surfaces connected to a first and a second electrode. A zirconium oxide cylinder adjacent the first cylinder when activated by a defect in the cell ionizes oxygen at its surface and the oxygen ions pass through the zirconium wall into the interior. When the oxygen pressure is high, it forces sodium from the first space into the second space.

FIG. 4 shows a further embodiment of a shunt element 1. The latter has a space 6 and a space 10 which directly adjoin each other. The space 6 is bounded by a cylinder 2 of aluminum oxide or beta/beta"-aluminum oxide. This cylinder has at one of its ends an inward pointing flange 2F. Through this flange, the interior of this cylinder 2 is closed off only partially, so that an opening remains at this end. This opening can also be closed by a thin diaphragm. This diaphragm is designed so that it can be destroyed by means of a gas overpressure. A tube 3, closed off on one side, of aluminum oxide follows the partially closed end of the cylinder 2. The opening of the tube 3 faces the cylinder 2. The tube 3, at its closed end, has two feedthroughs 14 and 15 at a predeterminable distance by which two contact surfaces 16 and 18 are arranged, which protrude into the space 10. The feedthroughs 14 and 15 are hermetically sealed. The cylinder 2 and the tube 3 have approximately the same inside and outside diameter. They are arranged so that their longitudinal axes are on a straight line. The interior of the cylinder 2 is filled with a metal felt 8. The latter is saturated with a liquid or a reactionable metal compound.

If sodium is used as the metal and the cylinder 2 is made of beta/beta"-aluminum oxide, the sodium can be filled-in electrolytically through the cylinder wall 2. The second end of the cylinder 2 is closed off by an aluminum disc 7. This is followed by a tube 30 closed one side. The tube is preferably made of an oxygen ion-conducting zirconium oxide which is, for instance, stabilized with $Y_2O_3$. The tube 30 is arranged so that its opening faces the aluminum disc 7. The inside and outside diameters of the tube 30 correspond approximately to the inside and outside dimensions of the cylinder 2. The outside and inside surfaces of the tube 30 are coated with an electronically conducting layer 31. To develop this layer 31, firing platinum or silver is used. At its closed end, the tube 30 has a central feedthrough 32 through which the one contact area 33 is brought into the interior of the tube 30. The contact surface 33 is extended parallel to the longitudinal axis of the tube 30 and extends up to the aluminum disc 7. The first electrode 12 of the shunt element 1 is connected to the electron-conducting outside surface of the tube 30 and to the contact surface 16 which protrudes into the space 10. The second electrode 13 of the shunt element 1 is connected, electrically conducting to the contact surface 18 protruding into the space 10 and to the contact surface 33, which is arranged within the tube 30.

The two electrodes of the shunt element 1 are connected, as in the above-described embodiment examples, to the anodic or cathodic current collector of the sodium/sulfur storage cell 20. The ohmic resistance of this shunt element 1 is infinite as long as the sodium/sulfur storage cell is intact. If a voltage reversal at the electrodes 12 and 13 of the shunt element 1 occurs, then, oxygen of the air is ionized at the electron-conducting outer surface of the tube 30. These oxygen ions migrate through the tube 30 of zirconium oxide into the interior thereof. At the electron-conducting inside surface of the tube 30, gaseous oxygen is formed. Thereby, an overpressure is generated within the zirconium oxide tube 30; this overpressure increases until the aluminum disc 7 which is relatively thin and serves as a diaphragm, is ruptured. If the opening between the cylinder 2 and the tube 3 closed on one end is likewise closed off by a diaphragm (not shown here), then the latter will likewise be destroyed by the overpressure generated in the tube 30. Sodium which is additionally contained within the tube 6, is pushed, by the overpressure produced, into the space 10 where it shorts out the two contact surfaces 16 and 18 and thereby, the two electrodes 12 and 13 of the shunt element 1.

The invention is not limited to the embodiment examples described above. Rather it comprises all arrangements in which two spaces are provided which are arranged directly adjacent to each other, where the first space is filled with a liquid metal or a decomposable metal compound, and the second space has the contact surfaces of at least two electrodes which in the event of a voltage reversal are short-circuited by the melted metal which migrates from the first into the second space.

The term "an electrochemical storage cell" as used in the claims shall include a group of electrochemical storage cells in which at least two storage cells are connected in parallel.

I claim:

1. Shunt element for an electrochemical storage cell based on alkali metal and chalcogen, with at least one anode space for the anolyte and a cathode space for the catholyte, which spaces are separated from each other by an alkali ion-conducting solid electrolyte wall, and at least in places, are bounded by a metallic housing, comprising a first chamber with its interior space containing a metal or a decomposable metal compound, a second chamber with its interior space having two spaced contact surfaces, said two interior spaces adjoining one another, connecting means through which said metal in the first interior space moves into said adjoining second interior space, a first electrode connected to one spaced contact surface and a second electrode connected to the other contact surface, said first electrode additionally connected to at least one electron-conducting surface of the first space, and said two electrodes adapted for connection to the electrochemical storage cell.

2. Shunt element according to claim 1, wherein the two interior spaces of the chambers are separated from each other by an alkali-ion conducting wall.

3. Shunt element according to claim 1, wherein the two interior spaces of the chambers are separated by a thin diaphragm which can be ruptured by the formation of a gas overpressure.

4. Shunt element according to claim 1, wherein the two interior spaces of the chambers are connected together by an opening.

5. Shunt element according to claim 1, wherein the two interior spaces of the chambers are defined by two cylinders of beta aluminum oxide which have different diameters, with the cylinder having the smaller diameter arranged concentrically within the cylinder with the larger diameter; and wherein the two cylinders are of the same length and are closed off at both ends by a common aluminum oxide disc at each end.

6. Shunt element according to claim 5, wherein a metal screen is arranged within the first interior space all around at a distance from the larger cylinder, and wherein the metal screen is in communication via a feedthrough in the first aluminum oxide disc at one end, with the first electrode in an electrically conducting manner; and wherein a metal felt or metal wool is filled-in between the larger cylinder and the metal screen.

7. Shunt element according to claim 6, wherein the first electrode is connected, via a second feedthrough in the first aluminum oxide disc to said first contact surface, and the second electrode is connected via a feedthrough in the second aluminum oxide disc to the second contact surface in the second interior space.

8. Shunt element according to claim 7, wherein the two contact surfaces of the two electrodes are arranged opposite each other; and wherein their spacing is slightly smaller than the height of the second space and wherein the contact surface of the second electrode is surrounded by a metal felt.

9. Shunt element according to claim 1, wherein the two interior spaces are formed by two adjoining aluminum cylinders, the longitudinal axes of which lie in one plane; and wherein the two aluminum cylinders are closed off from each other by a circular disc of beta/beta"-aluminum oxide.

10. Shunt element according to claim 9, wherein an aluminum oxide disc with a central passage is placed at the second end of the second interior space; and wherein the second interior space is firmly closed off from the outside by an aluminum disc.

11. Shunt element according to claim 9, wherein the cylinder defining the first interior space has a thin point which acts as a bursting valve; and wherein said interior space is filled with a decomposable alkali metal compound, and wherein the first electrode is connected in an electrically conducting manner to the outer boundary surface of the first interior space and to the aluminum disc closing the second interior space.

12. Shunt element according to claim 10, wherein the cylinder defining the first interior space has a thin point which acts as a bursting valve; and wherein said interior space is filled with a decomposable alkali metal compound, and wherein the first electrode is connected in an electrically conducting manner to the outer boundary surface of the first interior space and to the aluminum disc closing the second interior space.

13. Shunt element according to claim 9 or claim 11, wherein the first contact surface of the first electrode extends through said central passage of the aluminum oxide disc into the second interior space and is connected in an electrically conducting manner to the aluminum disc; and wherein the aluminum cylinder defining the second interior space serves as a contact surface of the second electrode and is connected in an electrically conducting manner to the former; and wherein metal wool is arranged inside the second space at least in places, which metal wool is in communication in an electrically conducting manner with the metallic boundary surface of the second interior space.

14. Shunt element according to claim 1, wherein the first interior space is confined by a cylinder of beta/bet-a"-aluminum oxide and the second interior space by a tube of aluminum oxide closed on one side, and wherein the longitudinal axis of the cylinder and of the tube are disposed to lie in one plane.

15. Shunt element according to claim 14, wherein the first interior space has on the side facing the second interior space, an inward-pointing flange by which its interior is closed off in places; and wherein the first interior space is closed off at its second end by a very thin aluminum disc, against which the opening of a tube of zirconium oxide, closed on one side, is set.

16. Shunt element according to claim 14, wherein an electron-conducting layer of firing platinum or silver, is applied to the outside and inside surfaces of the zirconium oxide tube.

17. Shunt element according to claim 15, wherein an electron-conducting layer of firing platinum or silver, is applied to the outside and inside surfaces of the zirconium oxide tube.

18. Shunt element according to claim 16 or claim 17, wherein the first electrode is connected to the electron-conducting outer layer of the zirconium oxide tube and to a contact surface protruding into the second interior space; and wherein the second electrode is connected to a first contact surface within the zirconium oxide tube and is additionally in communication with a second contact surface which protrudes into the second space.

19. Shunt element according to claim 1, wherein an alkali metal which is liquid at 350° C. or an alkali metal compound which can be decomposed at 350° C., is filled into the first interior space.

* * * * *